June 24, 1930.  A. W. KATH  1,766,128
ROTARY RECIPROCATING VALVE FOR INTERNAL COMBUSTION ENGINES
Filed March 7, 1927  2 Sheets-Sheet 1

Inventor
Alfred W. Kath
By Whittemore Hulbert
Whittemore & Belknap
Attorneys

Inventor
Alfred W. Kath

Patented June 24, 1930

1,766,128

UNITED STATES PATENT OFFICE

ALFRED W. KATH, OF DETROIT, MICHIGAN

ROTARY RECIPROCATING VALVE FOR INTERNAL-COMBUSTION ENGINES

Application filed March 7, 1927. Serial No. 173,510.

The invention relates to valves for internal combustion engines of that type in which the valve chamber forms a portion of the combustion chamber and in which the valve has imparted thereto a rotary and reciprocating movement. It is the object of the present invention to obtain a construction which will maintain an effective seal during compression and explosion strokes of the engine and at the same time will be freely movable for the opening and closing of the ports. To this end the invention consists in the construction as hereinafter set forth.

Figure 1:
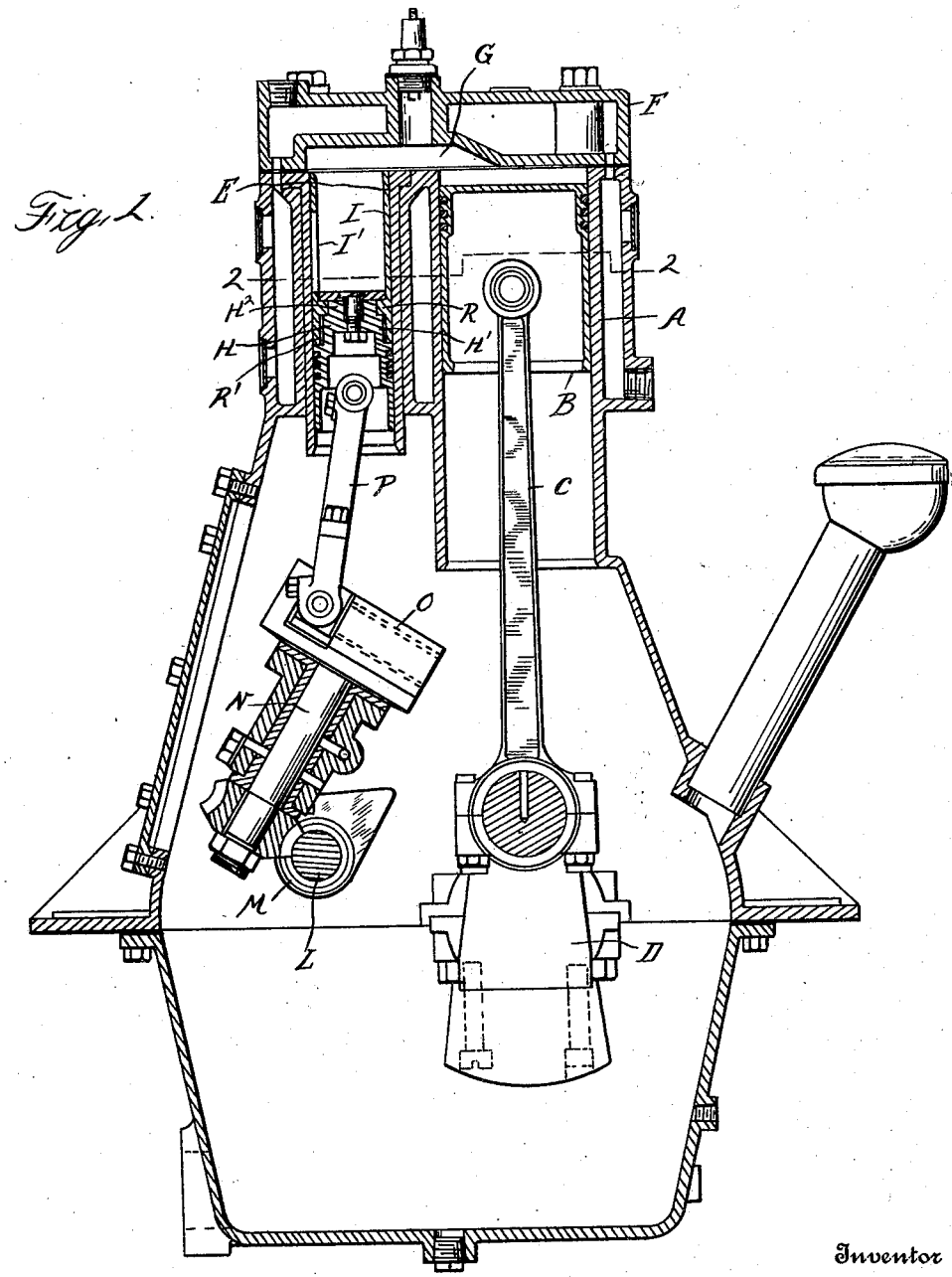
Figure 1 is a vertical central section through an internal combustion engine showing my improved valve and the operating mechanism therefor.
Figure 2:
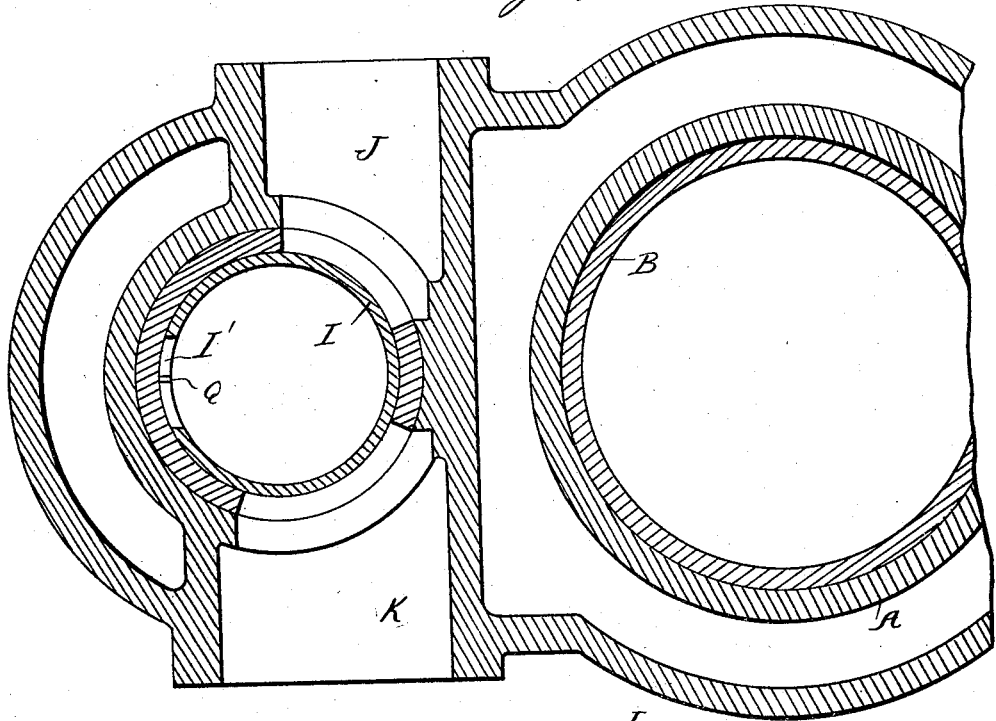
Figure 2 is a cross section on line 2—2 of Figure 1.
Figure 3:
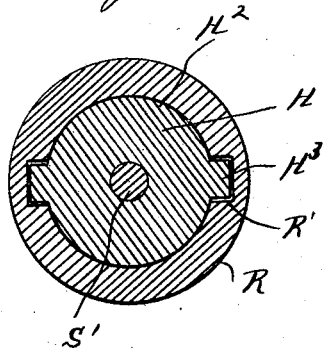
Figure 3 is a cross section on line 3—3 of Figure 4.
Figure 4:
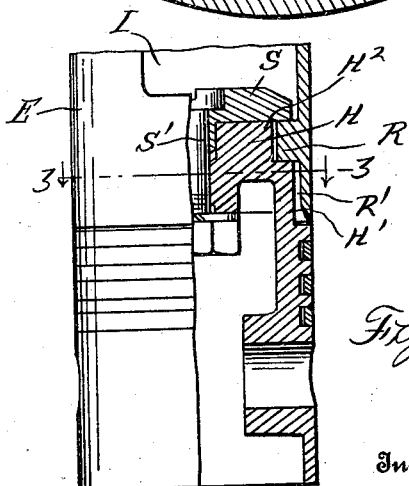
Figure 4 is a sectional side elevation of the valve head viewed at right angles to Figure 1.

A is the engine cylinder, B the piston therein connected by the rod C with the crank shaft D. E is a valve cylinder arranged parallel to the engine cylinder and preferably on the same block. F is a removable head for the block having the recessed passage-way G therein for connecting the engine cylinder with the valve cylinder. H is a rotary and reciprocating head arranged in the lower part of the valve cylinder and adapted to impart the desired rotary and reciprocating movement to the sleeve valve I which latter is provided with a port I' alternately registering with the inlet and exhaust ports J and K of the valve cylinder.

As has been stated my improved valve is of the type in which a combined rotary and reciprocating movement is imparted to the valve during its operation. The rotary movement is for the purpose of registering the ports but to maintain proper lubrication for the revolving parts there is also imparted a reciprocating movement to distribute the lubricant over the bearing surface. Any suitable mechanism may be employed for imparting this combined rotary and reciprocating movement to the valve but as shown the construction is as follows:

L is a shaft driven in a two to one ratio from the engine crank shaft D. M are spiral gears for transmitting rotary motion from the shaft L to a shaft N which is inclined to the axis of the valve cylinder E. O is a crank driven by the shaft N and having a universal pivotal connection with the rod P which extends to the head H and is pivotally connected therewith. The arrangement is such that the rotation of the crank O in a plane oblique to the axis of the valve cylinder E will through the medium of the rod D impart to the head H the desired rotary and reciprocating movement.

One of the chief difficulties in constructing a rotary valve for internal combustion engines is to obtain both an effective seal and freedom for operation. This is due to the fact that the high heat of the combustion gases will be imparted to the valve frequently warping or distorting the same so as to produce binding in the valve casing. Also the distortion of the valve will frequently destroy the seal permitting escape of the compressed gases. I have avoided these difficulties by a construction in which the valve sleeve is freely expansible and contractible to conform to the walls of its cylinder, while the driving head for the valve is formed by a piston having rings for sealing the same in the cylinder. The sleeve is also connected to the rotary head in such a manner as to be driven thereby without interference with the expansion or contraction of the sleeve.

In detail the sleeve I is longitudinally split as indicated at Q and is originally of an external diameter in excess of the internal diameter of the valve cylinder so as to be resiliently held thereagainst. The lower end of this sleeve is provided with an inwardly extending annular flange R having notches R' therein preferably on diametrically opposite sides. The head H has a portion H' loosely fitting within the lower end of the sleeve and a reduced portion H² loosely fitting within the annular flange R. The portion H² has lugs H³ which engage the notches R' in the flange R to produce a coupling for imparting the rotative movement of the head to the sleeve. A cap plate S secured to the portion H² by the bolt S' and engaging the flange R will couple the head to the sleeve for longitudinal or reciprocating movement. The whole arrangement is such that the sleeve is free to expand or contract and at the same time will be driven rotatably and longitudinally by said head.

In operation the suction stroke of the piston B occurs during the registration of the port I' with the inlet port J. This admits the explosive mixture which during the compression and explosion strokes is held in the valve chamber the port I' being closed. The port I' is then registered with the exhaust port K during the scavenging stroke. Any distortion of the valve or valve cylinder due to the heat of combustion will not affect the operation as the valve is permitted to contract or expand as required. Also the valve being only loosely connected to the head H is free to adjust itself into full contact with the walls of the cylinder.

What I claim as my invention is:

1. In an internal combustion engine, the combination with a power cylinder, of a valve cylinder provided with inlet and exhaust ports in the walls thereof and having one end in constant communication with said power cylinder, a radially expansible sleeve valve in said valve cylinder having an opening for placing the interior of the sleeve in constant communication with the combustion chamber and port means adapted for alternate registration with said inlet and exhaust ports and means for moving said sleeve valve to open and close said ports in proper sequence.

2. In an internal combustion engine, the combination with a power cylinder, of a valve cylinder provided with inlet and exhaust ports in the walls thereof, and having one end in constant communication with said power cylinder, a longitudinally split radially expansible sleeve valve within said valve cylinder, said valve having an open end for placing the interior of the valve in constant communication with the combustion chamber and being provided with single port means for alternately registering with said inlet and exhaust ports and means for moving said valve to open and close said ports in timed sequence.

3. In an internal combustion engine, the combination with a power cylinder, of a valve cylinder provided with inlet and exhaust ports in the walls thereof and connected to said power cylinder at one end, a radially expansible split valve in said valve cylinder having an open end for placing the interior thereof in constant communication with the combustion chamber and port means adapted for alternate registration with said inlet and exhaust ports, a head to which said sleeve valve is loosely connected sealing means for said head, and means for driving said head to impart to said valve a combined rotary and reciprocating movement such as to alternately open and close said inlet and exhaust ports in the proper sequence.

4. In an internal combustion engine, the combination with a power cylinder, of a valve cylinder having inlet and exhaust ports in the walls thereof and connected at one end to said power cylinder, a rotary and reciprocating head in said valve cylinder, sealing rings for said head, means for imparting to said head a combined rotary and reciprocating movement, a radially expansible split sleeve valve in said valve cylinder connected to and movable with said head having an open end for placing the interior of the sleeve in constant communication with the combustion chamber and port means adapted for alternate registration with said inlet and exhaust ports.

5. In an internal combustion engine, the combination with a power cylinder, of a valve cylinder having one end in constant communication with said power cylinder and provided in its side walls with inlet and exhaust ports, a piston head located in said valve cylinder and closing the opposite end thereof, a radially expansible longitudinally split sleeve valve within said valve cylinder and having a rotary driving connection with said head permitting freedom for radial expansion and slight angular adjustment with respect to the axis of said head and sleeve said sleeve having an open end for placing the interior of the sleeve in constant communication with the combustion chamber and being also provided with port means adapted for registration with said inlet and exhaust ports and means for imparting to said piston head a combined rotary and reciprocating movement whereby said valve sleeve is actuated to open and close said inlet and exhaust ports in properly timed sequence and is free to expand or contract to fit the wall of the valve cylinder.

6. In an internal combustion engine, the combination with a power cylinder, of a valve cylinder provided with inlet and exhaust ports in the walls thereof and connected at one end to said power cylinder, a sleeve valve in said valve cylinder having an opening for placing the interior of the valve in constant communication with the combustion chamber and port means adapted for alternate registration with said inlet and exhaust ports, and means for moving said valve to open and close said ports in proper sequence.

7. In an internal combustion engine, the combination with a power cylinder, of a valve cylinder provided with inlet and exhaust ports in the walls thereof and connected at one end to said power cylinder, a radially expansible split sleeve valve in said valve cylinder having an opening for placing the interior of the valve in constant communication with the combustion chamber and port means adapted for alternate registration with said inlet and exhaust ports, and means for moving said valve to open and close said ports in proper sequence.

8. In an internal combustion engine, the combination with a power cylinder, a valve cylinder, a removable head for closing said cylinders having a recessed passageway establishing communication therebetween, said valve cylinder being provided with inlet and exhaust ports in the walls thereof, a piston head located in said valve cylinder and closing one end thereof, sealing rings for said head, a radially expansible split sleeve within said valve cylinder and having an open end for placing the interior of the sleeve in constant communication with the combustion chamber, said sleeve also having a rotary driving connection with said head permitting radial expansion and slight angular adjustment with respect to the axis of said head, said sleeve being also provided with port means adapted for registration with said inlet and exhaust ports, and means for imparting to said piston head a rotary movement whereby said valve sleeve is actuated to open and close said inlet and exhaust ports in timed sequence, and is free to expand or contract to fit the walls of the valve cylinder.

In testimony whereof I affix my signature.

ALFRED W. KATH.